(12) United States Patent
Nguyen et al.

(10) Patent No.: US 9,857,538 B2
(45) Date of Patent: Jan. 2, 2018

(54) ALIGNMENT ADAPTER AND ALIGNMENT DESIGN FOR A CONNECTOR THEREFOR

(71) Applicant: US Conec, Ltd., Hickory, NC (US)

(72) Inventors: Hiep Nguyen, Fort Hill, SC (US); Darrell R. Childers, Hickory, NC (US); Michael E. Hughes, Hickory, NC (US); Jillcha Fekadu Wakjira, Hickory, NC (US); Joseph P. Howard, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 468 days.

(21) Appl. No.: 14/214,931

(22) Filed: Mar. 15, 2014

(65) Prior Publication Data

US 2016/0161680 A1   Jun. 9, 2016

Related U.S. Application Data

(60) Provisional application No. 61/789,499, filed on Mar. 15, 2013.

(51) Int. Cl.
*G02B 6/38* (2006.01)

(52) U.S. Cl.
CPC .......... *G02B 6/3879* (2013.01); *G02B 6/3817* (2013.01); *G02B 6/3825* (2013.01); *G02B 6/3881* (2013.01); *G02B 6/3885* (2013.01)

(58) Field of Classification Search
CPC .................................................. G02B 6/3879
See application file for complete search history.

(56) References Cited

U.S. PATENT DOCUMENTS

| | | | | |
|---|---|---|---|---|
| 5,129,024 A | * | 7/1992 | Honma | G02B 6/3825 385/53 |
| 6,331,079 B1 | * | 12/2001 | Grois | G02B 6/3821 385/53 |
| 2011/0091158 A1 | * | 4/2011 | Iwaya | G02B 6/3879 385/54 |

* cited by examiner

*Primary Examiner* — Omar R Rojas
(74) *Attorney, Agent, or Firm* — Michael L. Leetzow, P.A.

(57) ABSTRACT

An adapter with novel alignment features engages alignment features on a plug, providing general alignment of the ferrule holders and ferrules in the plug. After the plug engages the adapter, the ferrule holders engage a second set of alignment features in the adapter to provide fine alignment for the ferrules.

8 Claims, 10 Drawing Sheets

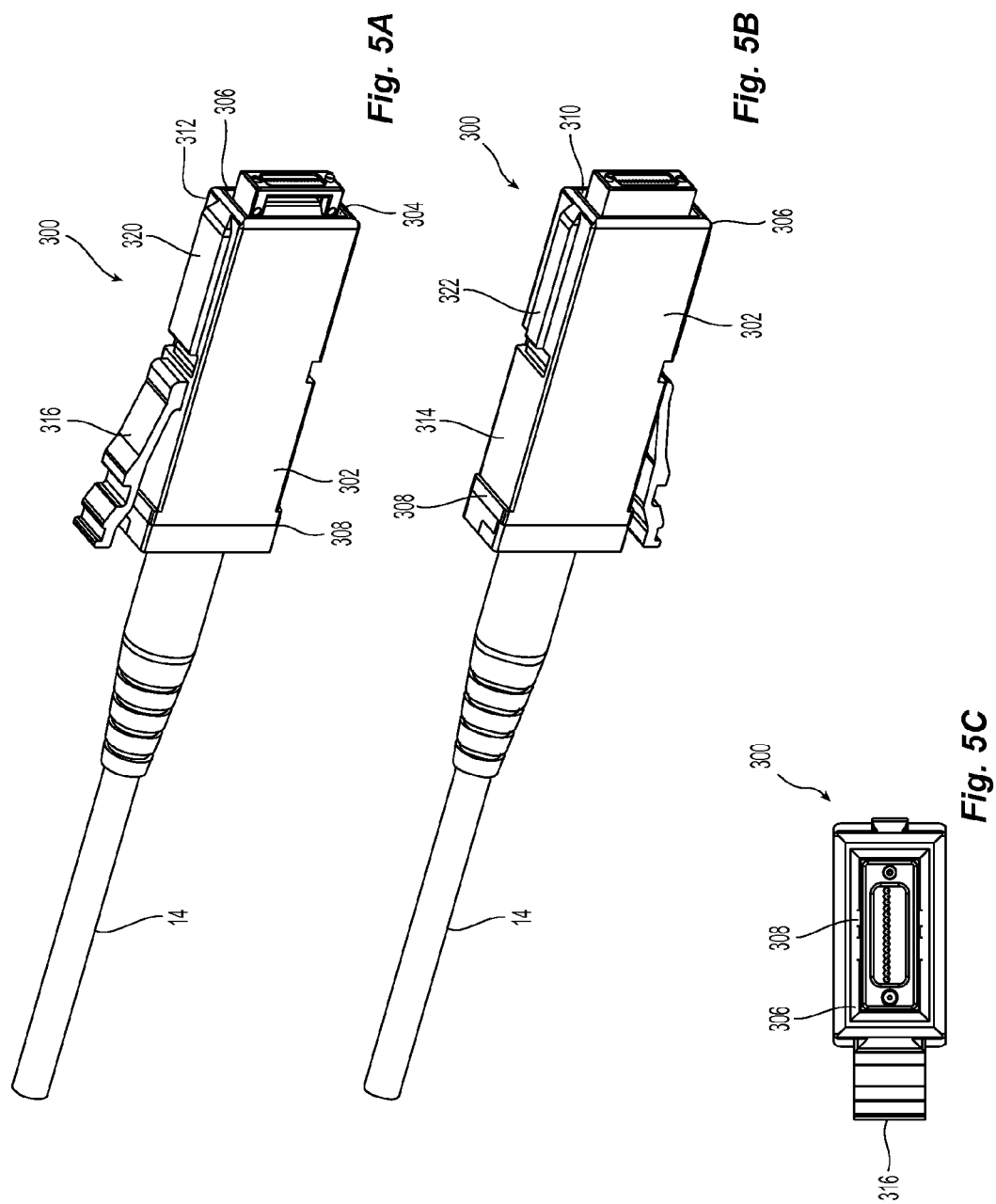

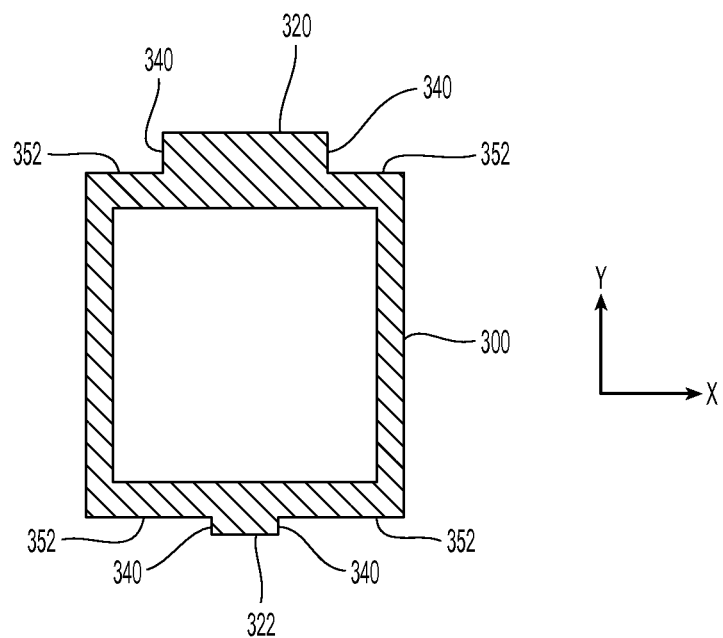
*Fig. 7A*
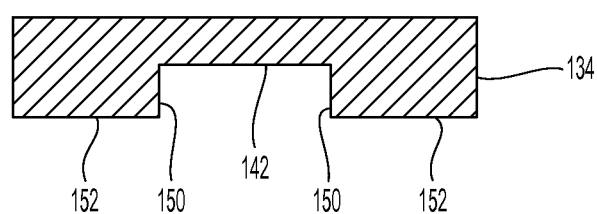
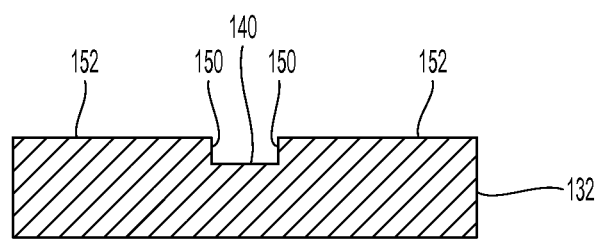
*Fig. 7B*

ALIGNMENT ADAPTER AND ALIGNMENT DESIGN FOR A CONNECTOR THEREFOR

REFERENCE TO RELATED CASE

This application claims priority under 35 U.S.C. §119 (e) to provisional application No. 61/789,499 filed on Mar. 15, 2013, the contents of which is hereby incorporated by reference in its entirety.

BACKGROUND OF THE INVENTION

Field of the Invention

There is a need for fiber optic connectors with fiber optic ferrules that are ganged together with a tight pitch between those fiber optic ferrules. Such a design allows for many fiber optic ferrules to be connected simultaneously while occupying less space. In addition, it allows the fiber optic ferrules to be organized in a prearranged routing of the optical fibers so that the complexity of fiber optic connector routing is reduced for the user. Typically, these ganged fiber optic ferrules are mounted into a single housing and the housings are then mated to one another. The alignment between a pair of ferrules to be mated is complex and requires tight tolerances because there is a tolerance stack-up that includes the true position of the fiber optic ferrule relative to the housing. By requiring a tight tolerance of the housing relative to the fiber optic ferrule, the designs are expensive to design, maintain, and to scale to various fiber optic ferrule counts. It is also difficult to scale to very large arrays of fiber optic ferrules within one housing due to the true position tolerance required for every fiber optic ferrule to the housings and also the larger distances from the fiber optic ferrules to the housings.

An alternative way to align the ferrules to each other is to align the ferrule holders to one another through features in the adapter. Rather than using the sides of the ferrule holder to align the ferrule holder to the adapter, top and bottom keys on the ferrule holder align the ferrule holder relative to the adapter in the x-direction. The orientation of the ferrule holder is controlled by the width difference between the top and the bottom key. The height of the ferrule holder aligns the ferrule holder in the y direction. A plug is used to assemble a plurality of the ferrule holders together. The ferrule holders protrude through the plug so the ferrule holder features can be aligned in the adapter after the plug engages the adapter and aligns the ferrule holders with their own structures. The alignment in the X and Y directions between the ferrule holder and the adapter are maintained within 100 microns, preferably within 50 microns. The ferrule holders are relatively loosely held within the plug so as to not over constrain the ferrule holders in the adapter (greater than 100 microns). The grooves within the adapter that aligns the ferrule holders is one continuous feature for both sides of the adapter and the mating ferrule holders. By making the groove one continuous feature for both sides, the alignment the mating ferrule holders is guaranteed. The size of the groove is critical but the true position of the alignment feature relative to the adapter-to-plug alignment feature is not critical. By using this alignment mechanism, large arrays of ferrule holders can be manufactured. Only the size of the alignment mechanism in the ferrule holder and the size of the alignment mechanism in the adapter must be maintained. The true position tolerances are significantly reduced.

Thus, an adapter and adapter assembly with novel alignment features is provided to engage with alignment features on a plug, which is turn assists in aligning the ferrule holders with alignment grooves in the adapter.

SUMMARY OF THE INVENTION

The present invention is directed to an adapter for aligning fiber optic ferrules inserted from opposing sides that includes a main body having an opening extending between a first side and a second side, the first side and the second side separated by a central portion, at least one groove in a top surface and a bottom surface of the first side and the second side, and a plurality of grooves disposed in a top surface and the bottom surface of the central portion, each of the plurality of grooves extending through the central portion from the first side to the second side.

According to another aspect of the present invention, adapter assembly for aligning one plurality of optical ferrules to another plurality of optical ferrules includes an adapter having an opening extending between a first side and a second side, the adapter having a plurality of grooves in the opening and extending in a direction from the first side to the second side, a plurality of ferrule holders, each of the plurality of ferrule holders having a central opening extending from a first end to a second end to resiliently retain a fiber optic ferrule therein, each of the plurality of ferrule holders having an opening in first end and in communication with the central opening, the second end opposite the first end and through which optical fibers extend, each of the plurality of ferrule holders having a projection on opposite outside surfaces to engage a corresponding groove in the adapter, and a plug having an outside surface and an inside surface, the inside surface defining an opening through the plug to hold a plurality of ferrule holders therein adjacent one another, the plug having grooves in the inside surface to engage the projections from the plurality of ferrule holders to align and orient the ferrule holders in the plug.

In yet another aspect, a ferrule holder includes a main body having a central opening to resiliently retain a fiber optic ferrule therein, a central opening in the main body and extending from a first end to a second end to resiliently retain a fiber optic ferrule therein, the first end having an opening therein and in communication with the central opening, the second end opposite the first end and through which optical fibers extend, and a projection on opposite outside surfaces of the main body to engage a corresponding groove in an adapter.

The present invention is also directed to a fiber optic connector that includes a plurality of ferrule holders, each of the plurality of ferrule holders having a central opening extending from a first end to a second end to resiliently retain a fiber optic ferrule therein, the ferrule holder having an opening in first end in communication with the central opening, the second end opposite the first end and through which optical fibers extend, each of the plurality of ferrule holders having a projection on opposite outside surfaces to engage a corresponding groove in the adapter, and a plug having an outside surface and an inside surface, the inside surface defining an opening through the plug to hold a plurality of ferrule holders therein adjacent one another, the plug having grooves in the inside surface to engage the projections from the plurality of ferrule holders to align and orient the ferrule holders in the plug Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 5A is a top perspective view of one embodiment of a ferrule holder and ferrule that can be used in the adapter assembly of FIG. 1;

FIG. 5B is a bottom perspective view of the ferrule holder and ferrule of FIG. 5a;

FIG. 5C is a front view of the ferrule holder and ferrule of FIG. 5a;

FIG. 7A is a partial cross sectional view of a portion of a ferrule holder of FIG. 5;

FIG. 7B is a partial cross sectional view of a portion of the center portion of the adapter;

DETAILED DESCRIPTION OF THE PREFERRED EMBODIMENTS

Figure 1:
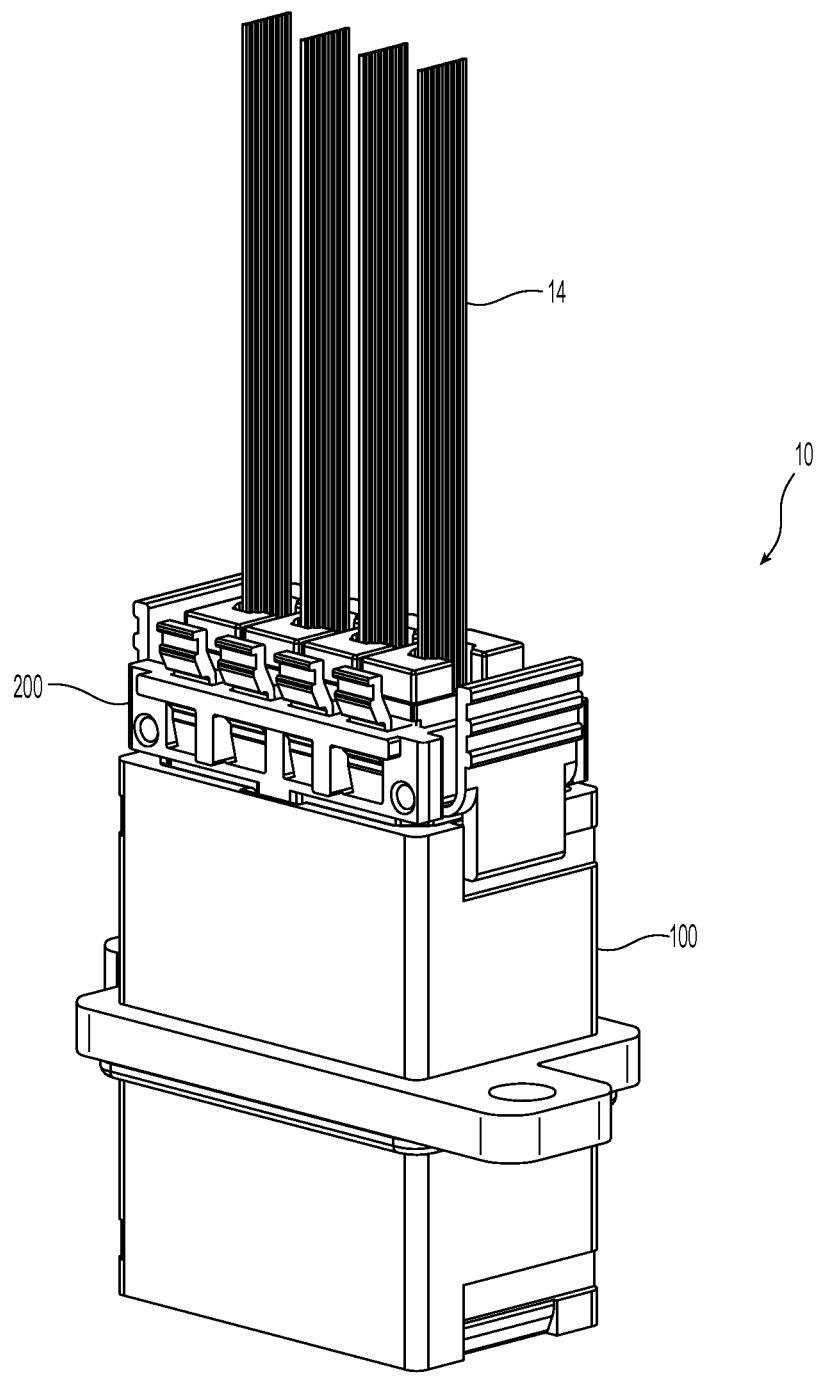
FIG. 1 is a perspective view of one embodiment of an adapter assembly according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
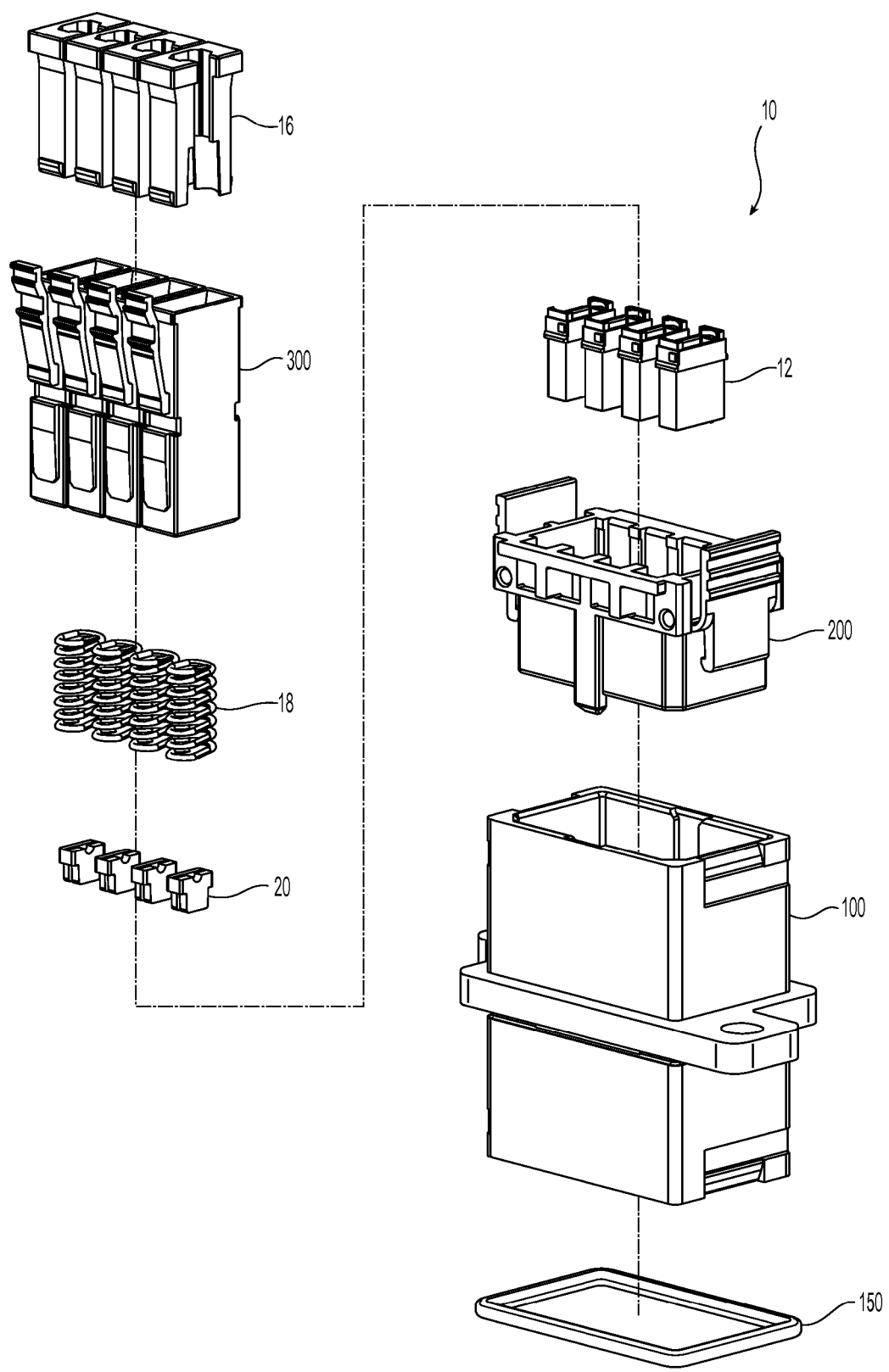
FIG. 2 is an exploded view of the adapter assembly of FIG. 1.
Figure 4:
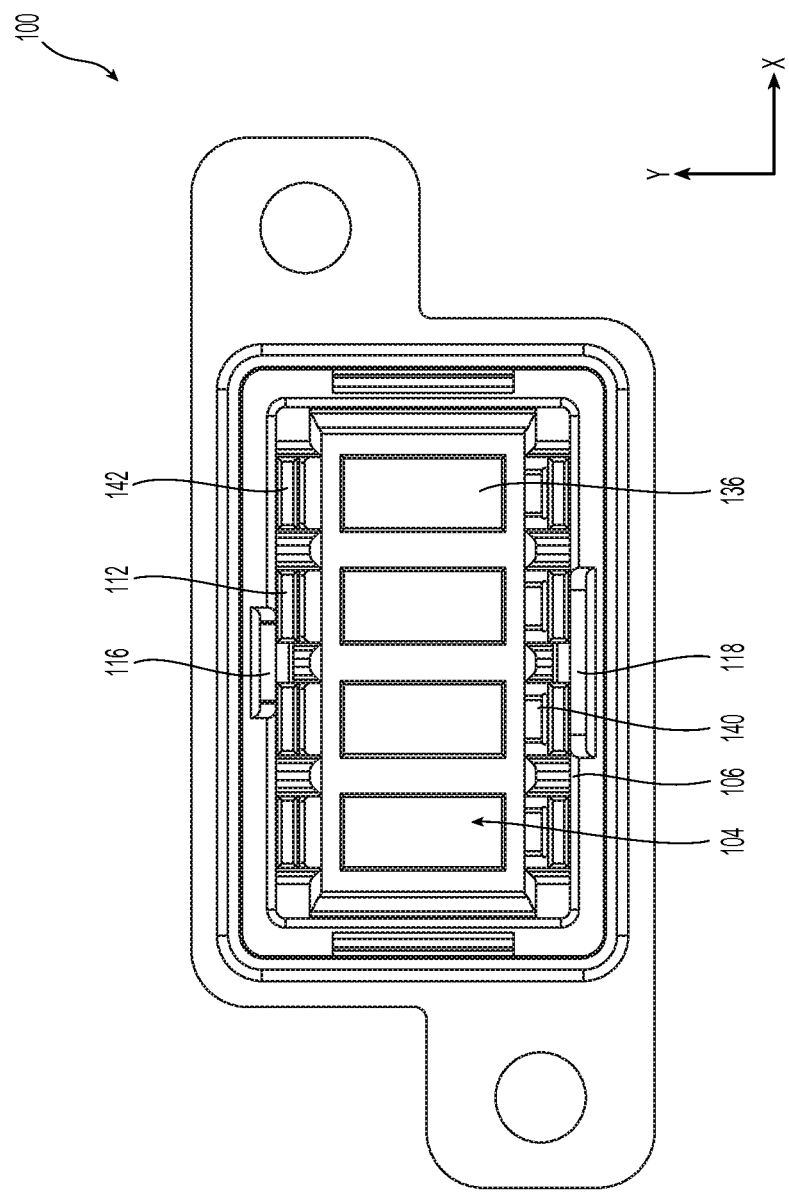
FIG. 4 is a front elevational view of the adapter of FIG. 1.

Referring to FIGS. 1 and 2, one embodiment of an adapter assembly 10 is illustrated. The adapter assembly 10 includes an adapter 100, a plug 200 and a ferrule holder 300. The adapter assembly 10 is used to align ferrules 12 to other ferrules in a tightly controlled manner and in a tighter space than has been possible before. The ferrules 12 are typically multi-fiber ferrules, particularly MT type ferrules, but the present invention may include other types of ferrules. The ferrules 12 are disposed within the ferrule holder 300 and have optical fibers 14 secured therein, which may be loose optical fibers, ribbonized optical fibers, or optical fibers in any other configuration. The ferrules 12 are resiliently held in the ferrule holder 300 using a spring push 16 that engages a spring 18. The spring 18 then presses on a pin keeper 20, as is known in the art, to bias the ferrules 12 forward in the ferrule holder 300. As is described in more detail below, the ferrules 12 are held somewhat loosely within the ferrule holder 300 so that they can move relative to the ferrule holder 300 to align with other ferrules 12 that are inserted in the adapter 100 from the other side. Similarly, the ferrule holders 300 are inserted into the plug 200 and they are also loosely held in the plug 200. That is, there is typically more than 100 microns of movement in the x and y directions (See FIG. 4.) available to the ferrule holder 300 in the plug 200, as explained in more detail below.

As illustrated in FIGS. 5A-C, the ferrule holder 300 has a main body 302 with a central opening 304 that extends from a first end 306 to a second end 308 to house the fiber optic ferrules 12. The first end 306 has an opening 310 therein to allow access to the ferrule 12. The ferrule 12 may or may not exit the main body 302. That is, the ferrule 12 may extend beyond the main body 302 as shown in the figures or it may be flush with the first end 306. second end 308 allows for the optical fibers 14 (shown in FIGS. 5A and 5B to have a boot and a covering) to exit the ferrule holder 300. The ferrule holder 300 has a top surface 312 and a bottom surface 314, with a cantilevered latch 316 to engage the plug 200. The top surface 312 has a projection 320 and the bottom surface 314 has a projection 322. The projections 320,322 are preferably elongated and have a chamfered front end. The projections 320,322 are used to engage grooves in the plug 200 and the adapter 100 to position the ferrule holders 300 with precision in the adapter 100. The projection 320 has a width that is different that the width of projection 322 so as to act as a key in inserting the ferrule holder 300 in the plug 200. While the projection 320 is wider than projection 322, it could be opposite in that projection 320 is more narrow than projection 322. The projections 320,322 are preferably on the top and the bottom surfaces 312,314 of the ferrule holder 300 to allow, as illustrated below, more ferrule holders to be inserted into the adapter 100 and the plug 200. The projections 320,322 are used to position the ferrules 12 in the adapter in the x and y directions, eliminating the need for side walls to position the ferrule holders 300 and the ferrules 12.

The plug 200 will now be described relative to FIGS. 6A-6C. The plug 200 has an outside surface 202 and an inside surface 204. The inside surface 204 defines an opening 206 therethrough to allow the ferrule holders 300 to be inserted therein. The inside surface 204 has a plurality of grooves 208 on a top side 210 and a corresponding plurality of grooves 212 on the bottom side 214. The grooves 208 and 212 are dimensioned to accept the projections 320,322 from the ferrule holders 300. It should be noted that the ferrule holders 300 are adjacent to one another, that is side-by-side without any material from the plug 200 therebetween. Applicant means that by using the term adjacent herein, there is no structure that comes between the neighboring ferrule holders 300.

Figure 6A:
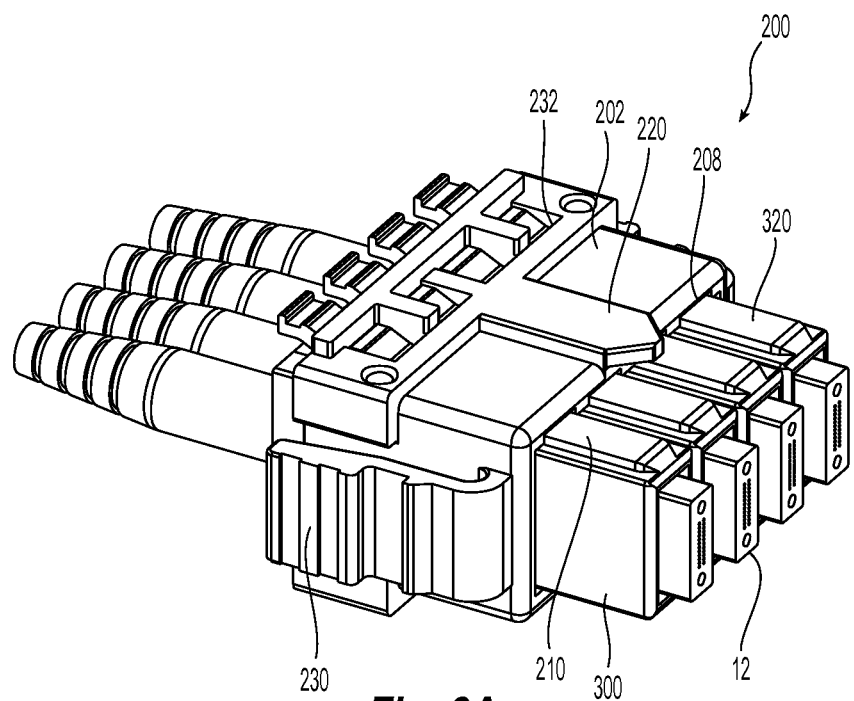
FIG. 6A is a top perspective view of a plug and ferrule holders according to the present invention.
Figure 6B:
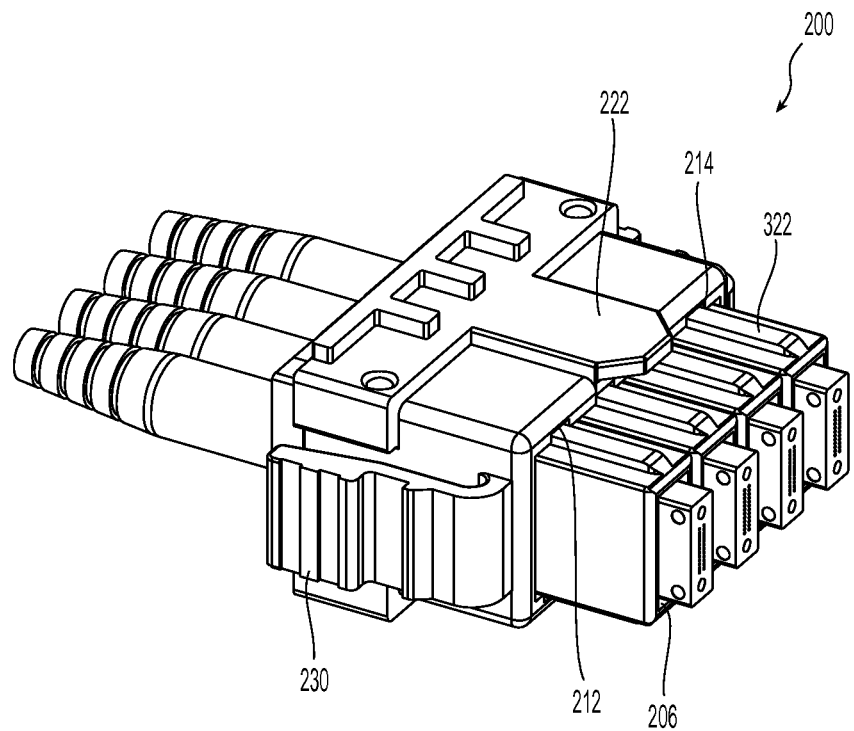
FIG. 6B is a bottom perspective view of the plug and ferrule holders of FIG. 6A.
Figure 6C:
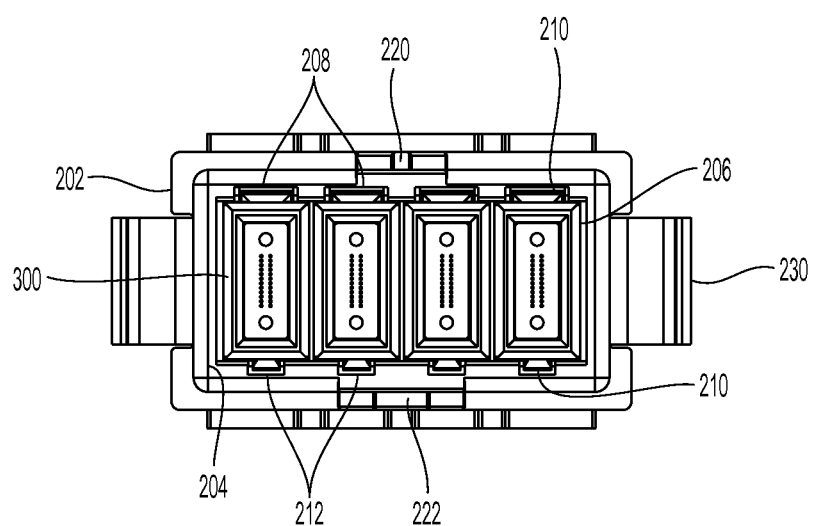
FIG. 6C is a front elevational view of the plug and ferrule holders of FIG. 6A.

The outside surface 202 also has a projection 220 on the top of the plug 200, seen in FIG. 6A, and also a projection 222 on the bottom of the plug 200, seen in FIG. 6B. Again, as with the projections 320,322, projection 220 has a width that is different that the width of projection 222 so as to act as a key in inserting the plug 200 into the adapter 100. While the projection 220 is narrower than projection 222, it could be opposite in that projection 220 is wider than projection 222.

The plug 200 also has two cantilevered latches 230 on the sides to engage corresponding structure on the adapter 100.

There are also latch receptacles 232 on the top side of the plug 200 to engage the latches 316 of the ferrule holders 300.

As noted above, the grooves 208 and 212 in plug 200 are dimensioned to accept the projections 320,322 from the ferrule holders 300. There is sufficient movement in the ferrule holders 300 relative to the plug 200 that when the plug 200 and ferrule holders 300 as assembled is inserted into the adapter 100, that the ferrule holders 300 can move to allow the projections 320,322 from the ferrule holders 300 to engage corresponding grooves in the adapter 100 as described below in more detail.

Figure 3:
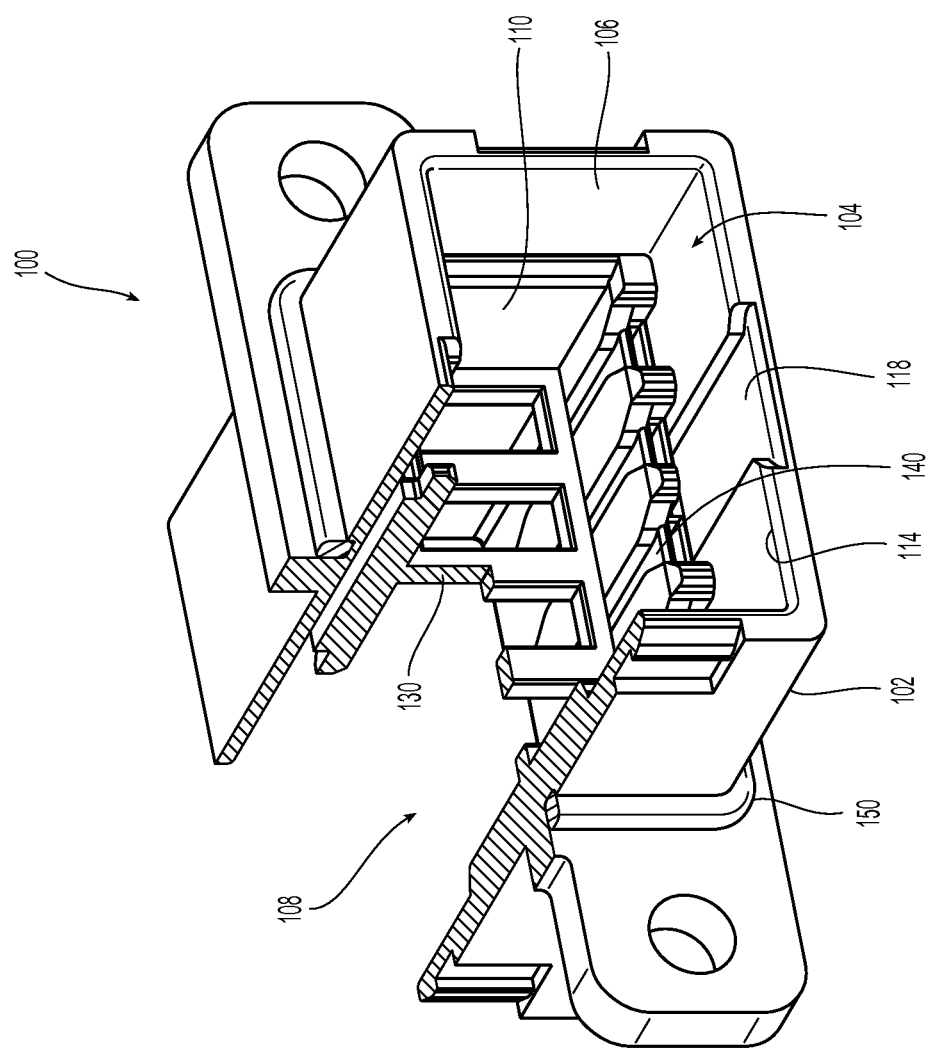
FIG. 3 is a perspective view of a cut-away view of the adapter of FIG. 1.

Returning to FIGS. 3 and 4, the adapter 100 is illustrated in more detail. The adapter 100 has a main body 102 with an opening 104 extending between a first side 106 and a second side 108. The first side 106 and a second side 108 are separated by a central portion 110. The first side 106 has a top surface 112 and a bottom surface 114. The top surface 112 has a groove 116 and the bottom surface 114 has a groove 118. The grooves 116,118 correspond to the projections 220,222 from the plug 200. The location of the wider groove in the adapter 100 will correspond with the wider projection on the plug 200.

The adapter has the center portion 110. Center portion 110 preferably has a wall 130 that extends across the opening 104 in the adapter 100 and divides the center portion 110 in half. The center portion 110 also has a raised bottom portion 132 and a dropped top portion 134 that narrows the opening 104 in the center portion 110. The wall 130 preferably extends from the raised bottom portion 132 and a dropped top portion 134 or it may be excluded completely if there is no EMI concerns with the adapter 100. The wall 130 has a plurality of openings 136 that are sized to allow the ferrules 12 to pass therethrough to engage a corresponding ferrule 12. As noted above, if the ferrules 12 only extend to the end of the ferrule holder 330, then the openings 136 should be sized to allow the ferrule holders to also extend therethrough. The adapter 100 may also have an elastomeric gasket 150 that encircles an external surface of the adapter 100 to provide EMI shielding.

The raised bottom portion 132 and a dropped top portion 134 also have a plurality of grooves 140, 142, respectively, that extend completely across the central portion 110. The grooves 140, 142 are like those in the plug 200, in that they are to engage the projections 320,322 from the ferrule holders 300. The grooves 140,142 preferably extend completely across the center portion 110 as they are formed with the same insert in the mold. Therefore, the grooves 140,142 are sure to align the ferrule holders 300 on each side of the adapter 100 as they are inserted into the adapter 100.

As the plug 200 with the ferrule holders 300 positioned therein are inserted into the adapter 100, the projections 220,222 from the plug 200 engage the grooves 116,118 on the top surface 112 and the bottom surface 114 to roughly align the ferrule holders 300 with the center portion 110 and the plurality of grooves 140 in particular. Then, as the plug 200 is inserted farther into the adapter 100, the projections 320,322 from the ferrule holders 300 engage plurality of grooves 140, 142 to align the ferrule holders 300 with the adapter and the openings 136 in the wall 130. When a plug 200 is inserted on the second side, the ferrules in the ferrule holders on the other side will be in alignment with the first side.

The position of the ferrule holders 300 on the first side 106 of the adapter relative to the ferrule holders 300 on the second side 108 is what allows the optical ferrules to be aligned with one another. There is no need, as discussed above, to worry about the stacking of tolerances as in the prior art. The positioning of the projections 320,322 on the ferrule holders 300 relative to the plurality of grooves 140, 142 is important. With reference to FIGS. 7A and 7B, the projections 320,322 are used to control the x and y locations of the ferrule holders 300. The surfaces 350 of the projections 320,322 (FIG. 7A) align with the surfaces 150 in the adapter (FIG. 7B) to control the x direction of the ferrule holder 300 relative to the adapter 100. The surfaces 352 of the ferrule holder 300 align with the surfaces 352 of the raised bottom portion 132 and the dropped top portion 134 of the center portion 110 to control the y direction of the ferrule holder 300 relative to the adapter 100. The surfaces of the projections 320,322 could also align in the y direction, given that they are parallel to the surfaces 352.

Figure 8:
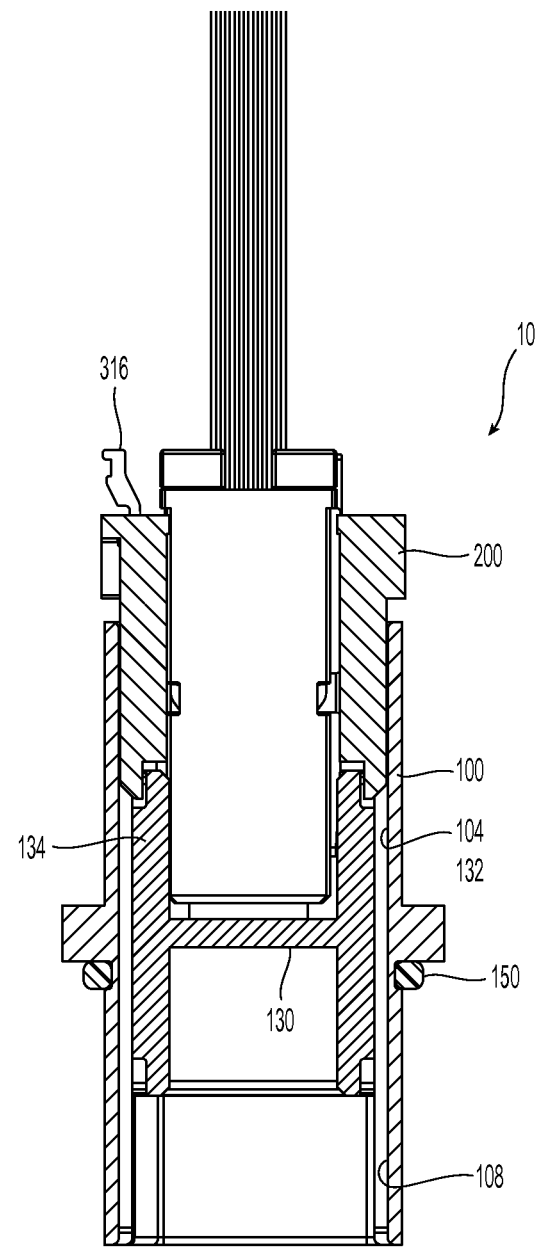
FIG. 8 is a cross sectional view of the adapter assembly in the center of the adapter assembly.
Figure 9:
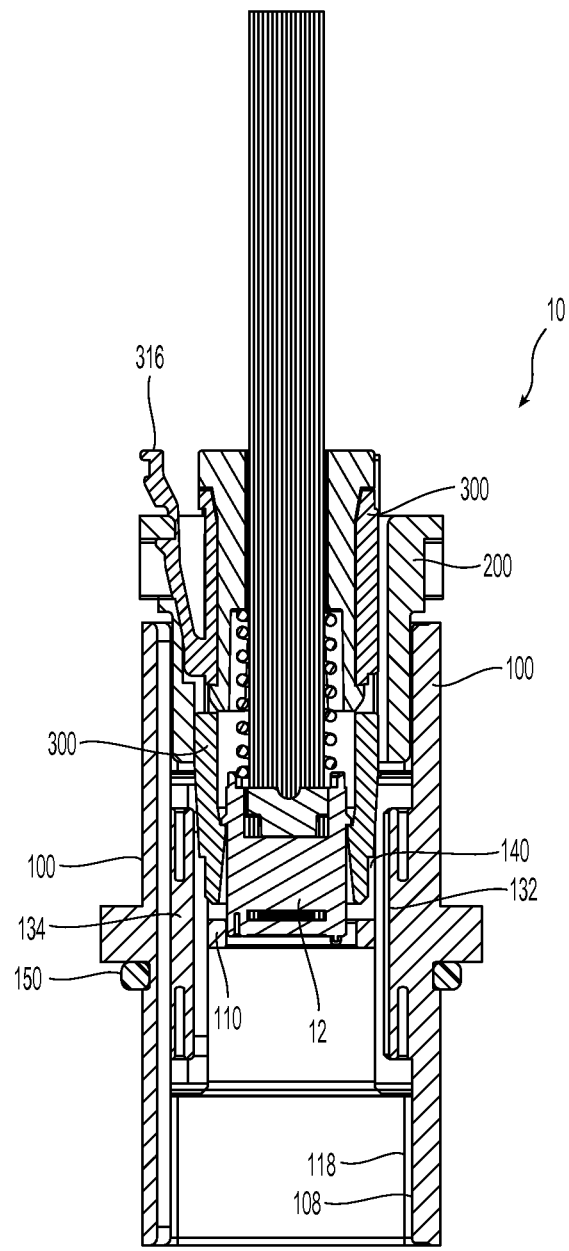
FIG. 9 is a cross sectional view of the adapter assembly through a ferrule holder and ferrule.

A cross section of the adapter assembly 10 is illustrated in FIG. 8 through the center of the adapter assembly. This illustrates the projections 220,200 in the openings 116,118 of the adapter 100. FIG. 9 is a cross sectional view of the adapter assembly 10 through a ferrule holder and ferrule illustrating the engagement of the projections 320,322 in the openings 140, 142.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An adapter assembly for aligning one plurality of optical ferrules to another plurality of optical ferrules comprising:
    an adapter having an opening extending between a first side and a second side, the adapter having a plurality of grooves in the opening and extending in a direction from the first side to the second side;
    a plurality of ferrule holders, each of the plurality of ferrule holders having a central opening extending from a first end to a second end to resiliently retain a fiber optic ferrule therein, each of the plurality of ferrule holders having an opening in first end and in communication with the central opening, the second end opposite the first end and through which optical fibers extend, each of the plurality of ferrule holders having a projection on opposite outside surfaces to engage a corresponding groove in the adapter; and
    a plug having an outside surface and an inside surface, the inside surface defining an opening through the plug to hold the plurality of ferrule holders therein adjacent one another, the plug having grooves in the inside surface to engage the projections from the plurality of ferrule holders to align and orient the ferrule holders in the plug.

2. The adapter assembly according to claim 1, wherein the outside of the plug has at least one projection to engage a groove in the opening in the adapter to align the plug in the opening in the adapter.

3. The adapter assembly according to claim 2, wherein the projection on the outside of the plug engages the groove in the adapter before the projections on the plurality of ferrule holders engage the plurality of grooves in the adapter.

4. The adapter assembly according to claim 1, wherein the grooves act as a keyway.

5. The adapter assembly according to claim 1, wherein the opening has a central portion between the first side and the second side, the opening in the central portion being smaller than the opening in the first side and the second side, the plurality of grooves including a first groove in a top surface and a second groove in a bottom surface of both the first and second sides and a first plurality of grooves in a top surface and a second plurality of grooves in a bottom surface of the central portion.

6. The adapter assembly according to claim 5, wherein the first groove is configured to engage a first projection on the plug and the second groove is configured to engage a second projection on the plug.

7. The adapter assembly according to claim 5, wherein the first and second plurality of grooves extend across the central portion.

8. The adapter assembly according to claim 5, wherein the first grove in the top surface and the second groove in the bottom surface extend completely through the opening.

* * * * *